United States Patent [19]

Lortie

[11] Patent Number: 5,137,113
[45] Date of Patent: Aug. 11, 1992

[54] LINEMAN'S SAFETY STRAP ASSEMBLY

[76] Inventor: Michel Lortie, 75 Milton Street, Montreal, Quebec, 1V2

[21] Appl. No.: 807,203

[22] Filed: Dec. 16, 1991

[30] Foreign Application Priority Data

Dec. 17, 1990 [CA] Canada .................................. 2032399

[51] Int. Cl.⁵ ............................................. A62B 35/00
[52] U.S. Cl. ......................................... 182/9; 182/133
[58] Field of Search ................................... 182/9, 3-8, 182/133-136

[56] References Cited

U.S. PATENT DOCUMENTS

| | | | |
|---|---|---|---|
| 1,120,496 | 12/1914 | Holsclaw | 182/9 |
| 1,721,516 | 7/1929 | Jacobs | 182/9 |
| 2,381,114 | 8/1945 | Cox | 182/9 |
| 2,753,100 | 7/1956 | Montgomery | 182/9 |
| 2,920,714 | 1/1960 | Johnson | 182/9 |
| 3,840,091 | 10/1974 | Conlon | 182/9 |
| 4,712,646 | 12/1987 | Page . | |

*Primary Examiner*—Reinaldo P. Machado
*Attorney, Agent, or Firm*—Robic

[57] ABSTRACT

A lineman's safety strap assembly for attachment to a body belt, comprises: a pole strap having two ends; a cross belt strap extending between the two ends of the pole strap in order to form therewith a loop; the loop being able to open and close in order to engage and disengage the loop to and from a utility pole; two side straps; coupling clips for detachably connecting each side straps to the body belt; and connectors for connecting the side straps, cross-belt strap and pole strap together in such a manner that a lineman wearing the body belt is retained by the loop when the loop is closed around the pole and the body belt is connected to the side straps; at least one of the side straps being integral and continuous with the cross belt strap; the connectors means comprising a belt slide rigidly connected to at least one of the ends of the pole strap, for receiving and slidably holding the cross-belt strap. In the event of a fall, a weight of the lineman connected by the body belt to the side straps will apply a force on the at least one of the side straps and pull the cross-belt strap through the belt slide, thereby resulting in a shortening of the cross-belt strap and a tightening of the loop around the pole.

12 Claims, 3 Drawing Sheets

LINEMAN'S SAFETY STRAP ASSEMBLY

FIELD OF THE INVENTION

The present invention relates to a lineman's safety strap assembly for attachment to a body belt for gripping a utility pole in the event of a fall.

BACKGROUND OF THE INVENTION

A lineman's safety strap is used to facilitate climbing a utility pole. Attached to a body belt worn around the waist, the safety strap includes a pole strap for bearing against an outer face of the utility pole. A lineman wearing special cleated boots can climb the utility pole to serve utility lines with the help of the support and balance provided by the safety strap.

Should the lineman ever lose hold with his cleated boots, the safety strap prevents his falling away from the pole, however, a fall down the pole is not entirely prevented. In an effort to improve job safety, improved safety straps have been suggested which grip the utility pole during a fall.

U.S. Pat. No. 4,712,646 describes an improved strap assembly which grips the pole using an inclined sharp edge roller provided on the pole strap and a cross belt strap for bearing against an inner face of the pole, such that in the event of a fall the combined action of the cross belt strap and the sharp edge roller will catch on the pole and prevent a free fall.

However, it is important that the safety strap assembly be able to grip the pole quickly and effectively in the event of a fall, without any sliding down the pole, which can cause injury to the lineman and waste time in climbing the pole.

It is therefore an object of the present invention to provide a safety strap assembly which is able to grip a utility pole quickly and effectively in the event of a fall.

SUMMARY OF THE INVENTION

According to the invention, there is provided a lineman's safety strap assembly for attachment to a body belt, comprising a pole strap having two ends.

Preferably, a one of the side straps is continuous with the cross belt strap, and the connecting means further comprise a first belt connection at a one end of the pole strap, a first slide in the coupling means associated with the one of the side straps, the belt slide means comprising a second slide at the one end of the pole strap, and a second connection at another end of the pole strap. The one of the side straps preferably extends from the first belt connection, to the first slide, to the second slide to the second belt connection, whereby the one of the side straps forms a loop extending from the one of the pole strap through the first slide at the coupling means back to the one of the pole strap.

Also, preferably, the safety strap assembly further comprises brake means for preventing the cross belt strap from sliding and tightening the lopp. The brake means may comprise a cam and lever assembly having a lever connected to a cam and a brake plate, the cross belt being braked by friction acting between the cam and the brake plate when a force is applied to the lever, and the cross belt being free to slide when a force is released from the lever.

BRIEF DESCRIPTION OF THE DRAWINGS

A preferred embodiment of the invention will now be described with reference to the appended drawings in which.

DETAILED DESCRIPTION OF THE PREFERRED EMBODIMENT

Figure 1:
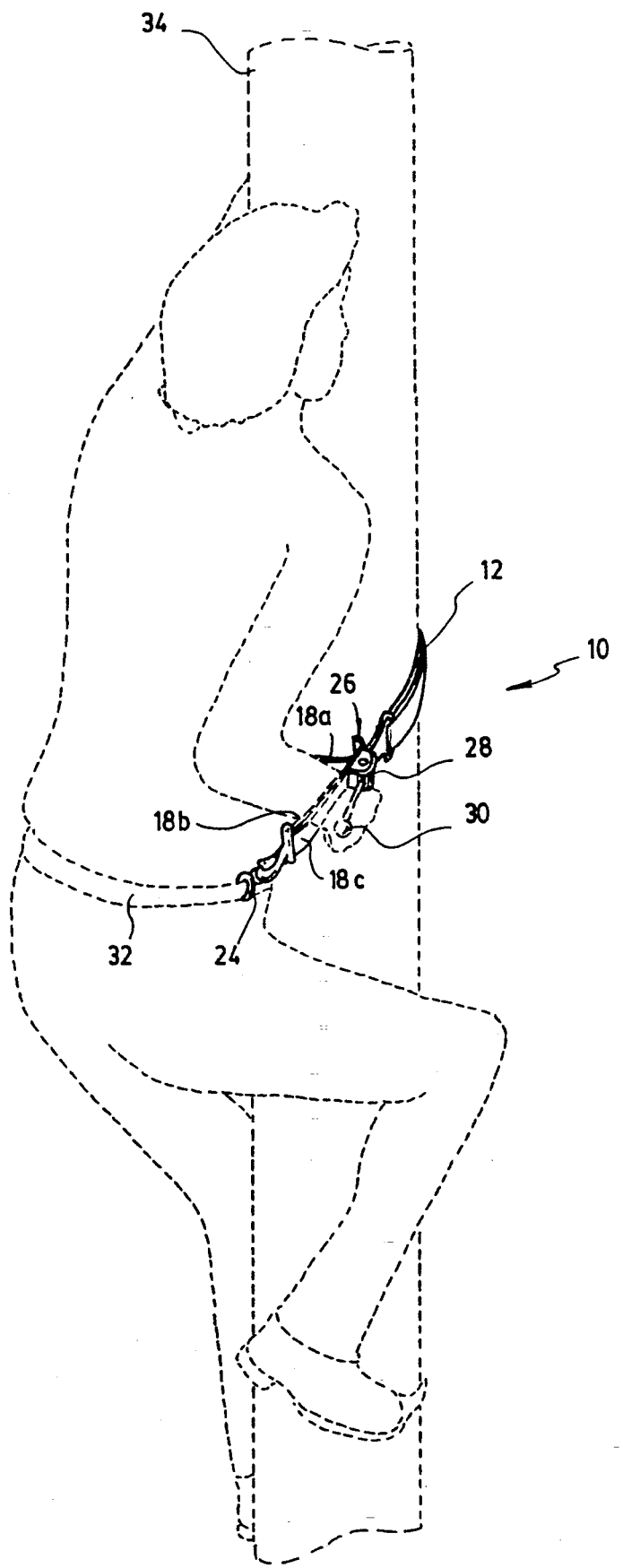
FIG. 1 is a view of the safety strap assembly according to the preferred embodiment as worn by a lineman.
Figure 2:
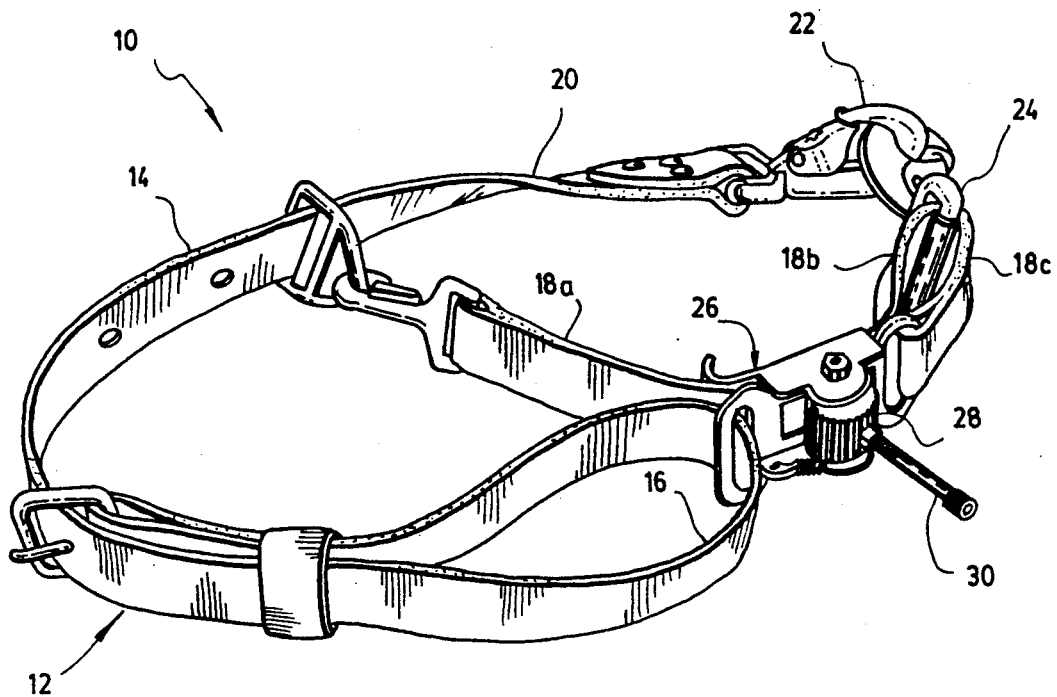
FIG. 2 is a perspective view of the preferred embodiment.
Figure 5:
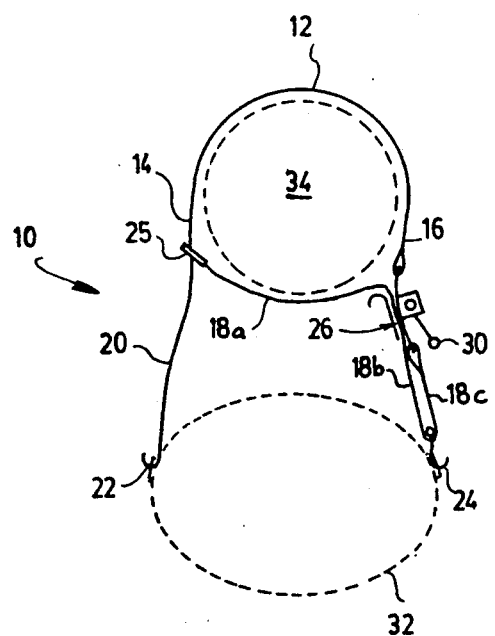
FIGS. 5 and 6 are top plan views of the safety strap assembly shown in FIG. 1, showing a slack and tightened state respectively.
Figure 6:
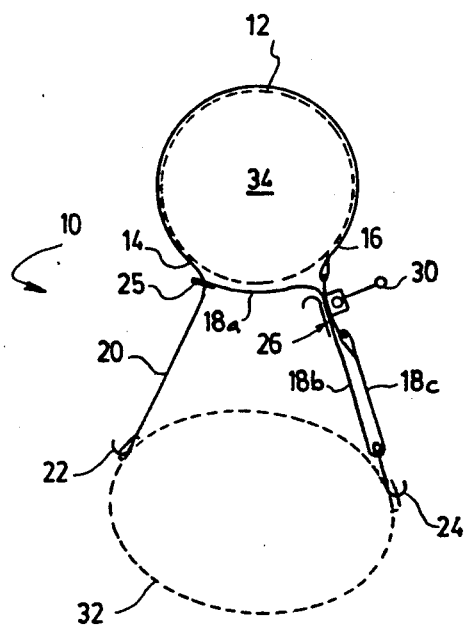

As shown in FIGS. 1 and 2, the safety strap assembly 10 comprises a pole strap 12, a cross belt strap 18, two side straps 20,21 which can be connected to a body belt 32 of a lineman 11 by means of coupling clips 22 and 24. As best shown in FIGS. 2, 5 and 6, pole strap 12 is fixed at one end 16 to a slide 26 and is fixed to a buckle 25 at another end 14. A cross belt strap 18 is detachably connected to buckle 25 and passes through the slide 26 at end 16 of the pole strap 12. The cross belt strap 18 is integral and continuous with side strap 21 continues through a slide at coupling clip 24 and is fixed to a part of slide 26. Segment 18a of the cross belt strap 18 spans between the two ends 14 and 16 of the pole strap 12 and first segment 18a is continuous with second segment 18b which extends through slide 26. Segment 18b is continuous through the slide at coupling clip 24 and is continuous with third segment 18c to be fixedly connected to slide member 26. Segments 18b and 18c form side strap 21. A brake system provided by a cam 28 and lever 30 acts on segment 18b to prevent the cross belt strap 18 from sliding through slide 26. Cam 28 and lever 30 are pivotally connected to slide 26. The cam is a cylinder which pivots excentrically about a longitudinal axis such that when the lever 30 is depressed, the cam 28 pinches the belt 18b between the cam and a surface of slide 26.

As can be understood, the pole strap 12 and the segment 18a of cross belt strap 18 are able to form a loop around utility pole 34. The loop around pole 34 is opened and closed by a belt attaching clip provided on buckle 25 between buckle 25 and portion 18a of the cross belt strap 18. As shown in FIGS. 5 and 6, when an outward force is applied to attachment 24 and the cam brake 28 is released, the cross belt strap 18 moves to tighten the loop around pole 34 by moving in the direction of the arrows shown. Slide 26, buckle 25 and coupling clip 24 act as connecting means for connecting the cross belt strap 18 with side strap 20 and pole strap 12, in such a manner that the lineman 11 wearing the body belt 32 is retained by the loop around pole 34. Cam 28 and lever 30 cooperate to form brake means acting on the cross belt strap for preventing closure of the loop around pole 34.

Figure 3:
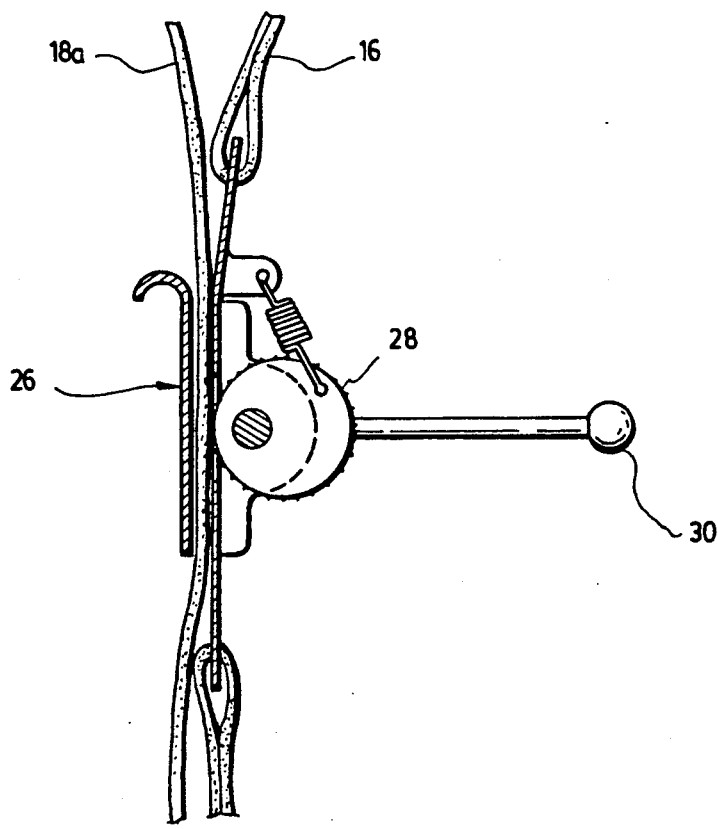
FIGS. 3 and 4 are detailed top views of the brake mechanism according to the preferred embodiment showing the released and tightened states respectively.
Figure 4:
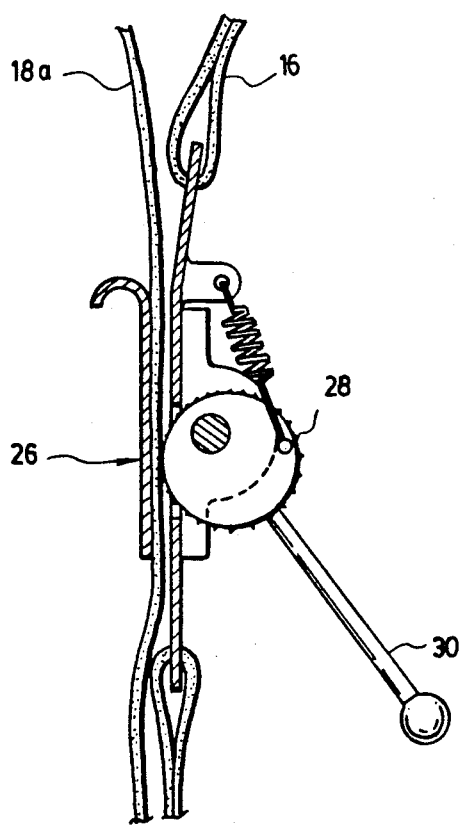

The safety strap assembly according to the preferred embodiment is used to climb pole 34 much like an ordinary safety strap assembly except that lever 30 may be held to keep the cross belt strap 18 from sliding closed while climbing the pole (see FIG. 4). In the event that the lineman should lose his footing, he would release the lever 30 (see FIG. 3) allowing the cross belt strap 18 to close the loop around pole 34. The weight of the lineman connected to the body belt 32 will pull on coupling 24 and the loop formed by the pole strap 12 and the segment 18a of the cross belt strap will close and grip pole 34 thus preventing the lineman from falling any further. At this point, the lineman may regain his footing, loosen the loop around pole 34 and continue climbing once again.

It is to be understood that the above description is not intended to limit the scope of the present invention as defined in the appended claims.

What is claimed is:

1. A lineman's safety strap assembly for attachement to a body belt, comprising:
   a pole strap having two ends;
   a cross belt strap extending between the two ends of said pole strap in order to form therewith a loop;
   means for closing and opening the loop in order to engage and disengage said loop to and from a utility pole;
   two side straps;
   coupling means for detachably connecting each of said side straps to the body belt; and
   connecting means for connecting the side straps, cross-belt strap and pole strap together in such a manner that a lineman wearing the body belt is retained by the loop when the loop is closed around the pole and the body belt is connected to the side straps; at least one of the side straps being integral and continuous with the cross belt strap; the connecting means comprising belt slide means rigidly connected to at least one of the ends of said pole strap, for receiving and slidably holding the cross-belt strap;
   whereby, in the event of a fall, a weight of the lineman connected by the body belt to the side straps will apply a force on said at least one of the side straps and pull the cross-belt strap through said belt slide means, thereby resulting in a shortening of said cross-belt strap and a tightening of said loop around the pole.

2. Safety strap assembly as claimed in claim 1, wherein:
   one of the side straps is continuous with the cross belt strap;
   said connecting means further comprise a first belt connection at one end of the pole strap, a first slide in said coupling means associated with said one of the side straps, said belt slide means comprising a second slide at said one end of the pole strap, and a second belt connection at another end of the pole strap; and
   said one of the side straps extends from said first belt connection, to said first slide, to said second slide to said second belt connection;
   whereby said one of said side straps forms a loop extending from said one end of the pole strap through said first slide at said coupling means back to said first one of said two ends of the pole strap.

3. Safety strap assembly as claimed in claim 2, wherein said second belt connection comprises a releaseable connection thereby providing said means to open and close the loop for engaging and disengaging the strap assemly from the pole.

4. Safety strap assembly as claimed in claim 1, 2 or 3, further comprising brake means for preventing said cross belt strap from sliding through said belt slide means and thightaning said loop.

5. Safety strap assembly as claimed in claim 4, wherein said brake means comprise a cam and lever assembly having a lever connected to a cam and a brake plate, said cross belt being braked by friction acting between the cam and the brake plate when a force is applied to the lever, and said cross belt being free to slide when a force is released from the lever.

6. Safety strap assembly as claimed in claim 5, further comprising a spring to bias the cam out of frictional contact with said cross belt.

7. Safety strap assembly as claimed in claim 2, wherein said cross belt tightening means further comprise brake means for preventing said cross belt strap from sliding and closing said length.

8. Safety strap assembly as claimed in claim 7, wherein said brake means comprise a cam and lever assembly having a lever connected to a cam and a brake plate, said cross belt being braked by friction acting between the cam and the brake plate when a force is applied to the lever, and said cross belt being free to slide when a force is released from the lever.

9. Safety strap assembly as claimed in claim 8, further comprising a spring to bias the cam out of frictional contact with said cross belt.

10. Safety strap assembly as claimed in claim 3, wherein said cross belt tightening means further comprise brake means for preventing said cross belt strap from sliding and closing said length.

11. Safety strap assembly as claimed in claim 10, wherein said brake means comprise a cam and lever assembly having a lever connected to a cam and a brake plate, said cross belt being braked by friction acting between the cam and the brake plate when a force is applied to the lever, and said cross belt being free to slide when a force is released from the lever.

12. Safety strap assembly as claimed in claim 11, further comprising a spring to bias the cam out of frictional contact with said cross belt.

* * * * *